Figure 9:
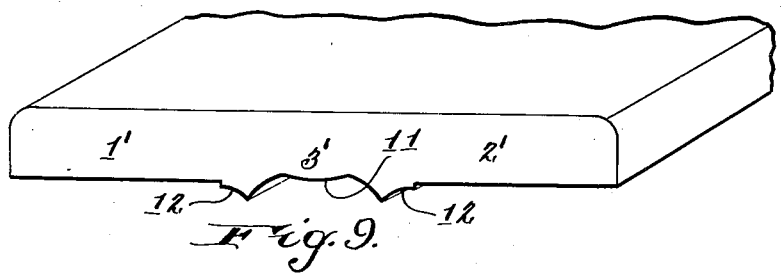

Feb. 24, 1931.  G. C. EASTER  1,794,064
METHOD OF MAKING NUTS
Filed Oct. 2, 1928  4 Sheets-Sheet 1
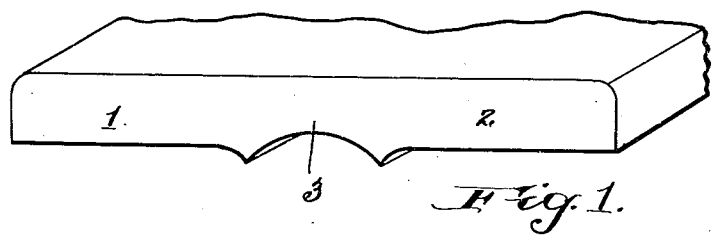
Fig. 1.
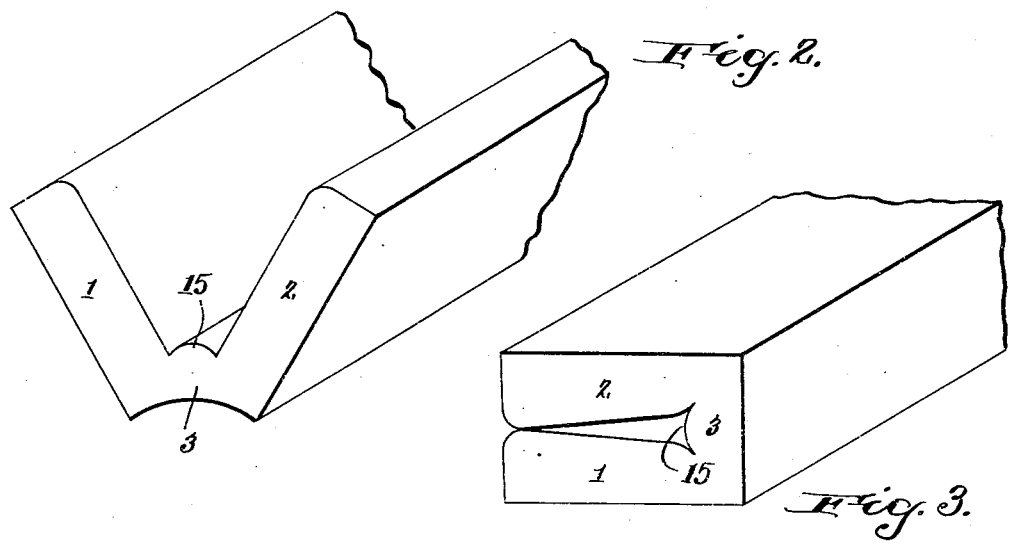
Fig. 2.
Fig. 3.
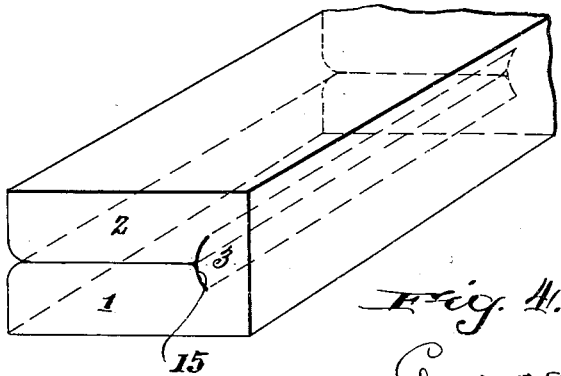
Fig. 4.
George C. Easter INVENTOR.
BY William W. Varney
ATTORNEYS.

Feb. 24, 1931. G. C. EASTER 1,794,064
METHOD OF MAKING NUTS
Filed Oct. 2, 1928 4 Sheets-Sheet 2
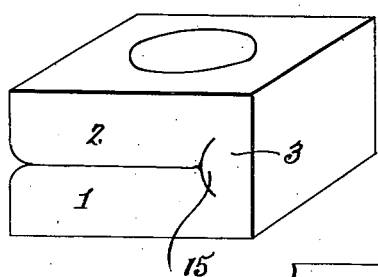
Fig. 5
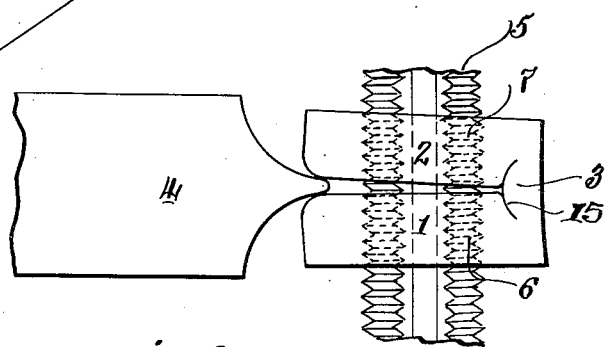
Fig. 6.
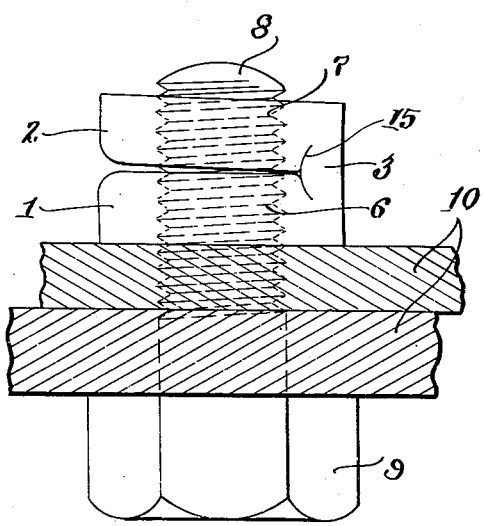
Fig. 8.
Fig. 7.
George C. Easter INVENTOR.
BY William W. Varney
ATTORNEYS.

Feb. 24, 1931.  G. C. EASTER  1,794,064
METHOD OF MAKING NUTS
Filed Oct. 2, 1928  4 Sheets-Sheet 3

INVENTOR.
George C. Easter
BY William W. Varnes
ATTORNEYS.

Feb. 24, 1931.  G. C. EASTER  1,794,064
METHOD OF MAKING NUTS
Filed Oct. 2, 1928    4 Sheets-Sheet 4

George C. Easter INVENTOR.
BY William W. Varney
ATTORNEYS.

Patented Feb. 24, 1931

1,794,064

UNITED STATES PATENT OFFICE

GEORGE C. EASTER, OF BALTIMORE, MARYLAND, ASSIGNOR, BY MESNE ASSIGNMENTS, TO THE VULCAN STEEL PRODUCTS COMPANY, OF BALTIMORE, MARYLAND, A CORPORATION OF MARYLAND

METHOD OF MAKING NUTS

Application filed October 2, 1928. Serial No. 309,743.

For reference, as this application has to do with the nuts, the subject matter of my two previous applications, I would refer to my application, filed July 26th, 1928, and given Serial No. 295,403, and my application, filed July 30th, 1928, and given Serial No. 296,191; and the members and yoke mentioned herein are primarily the members and yoke mentioned in said applications. But I do not wish to limit myself, however, to those particular patent applications, as the subject matter of this application is a broad subject matter concerning nuts of the grip nut type.

The object of my invention is to provide a new grip nut and process for making the same.

A further object of my invention is to provide a new grip nut which may be easily put on a bolt and easily removed therefrom, but which has an inherent tendency to lock thereon by gripping in opposite directions certain parts of the thread of said bolt.

With the foregoing and other objects in view, my invention consists of the methods employed, combination and arrangement of apparatus and means as hereinafter specifically provided and illustrated in the accompanying drawings wherein is shown the preferred embodiment of my invention, but it is understood that changes, variations and modifications may be resorted to which come within the scope of the claim hereunto appended.

I have discovered that a nut composed of two superimposed nuts, united by a common yoke, the portions being threaded in alignment to fit a bolt then relatively displaced axially of said threading, upon screwing on to a bolt are forced back into their initial position, and if made of rather soft material untempered, or unhardened, do not have the gripping tendency or will not come back into the position they were before being threaded upon the bolt upon being taken from said bolt; in other words, a permanent set has taken place in the uniting member which is integral with said members. I have discovered that by suitably rendering said yoke a spring, this defect is overcome. In brass, by rolling, hardening or hammering, and in steel, likewise, but in steel preferably by heat treating, or tempering, the rendering of said yoke a spring is accomplished and tends to maintain said superimposed nut portions, in the position formed after the threading, that is, out of register; and upon being placed upon a bolt they are forced into register against the tension of said spring.

In the formation of this grip nut the two portions thereof may be initially in contact and separated for threading and then allowed to come back or be brought back into contact at the hardening, or they may be threaded while in contact and then separated and tempered in a separated position. This latter means is not as good as the previous one, that is, separated first and then threaded, for the reason that the drag of the nut on the bolt forms a stronger gripping in the preferred method than in the other. I do not wish to be limited, however, to either method.

I have found that steel containing .30–.55 of one percent carbon makes a satisfactory nut. I am making nuts out of old railroad axles, which I find give satisfactory results.

I have found that heat treating the nuts, heating the same to 1300° Fahrenheit, and quenching in oil, or water, gives a satisfactory temper with the steel that I have been using. I have also discovered that with the steel I have been using hammering the yoke, or compressing or rolling it, also tempers it sufficiently for making a good nut. This, however, is not as practical in manufacture with present facilities as the heat treating. With non-ferric nuts, such as brass, or alloys, tempering by pressure or hammering is preferable, if not necessary.

In the drawings of the herein described embodiment of my invention, Figure 1 is a view of a bar formed to be rolled into a finished product from which my nuts may be fabricated; Fig. 2 is the same bar shown in Fig. 1 after having again passed the rolls; Fig. 3 shows the same bar after having again passed the rolls; Fig. 4 shows the same bar after final rolling, leaving it in a condition to have the nut blanks cut therefrom; Fig. 5 is a nut cut from the finished bar shown in Fig. 4; Fig. 6 is the nut blank opened for threading, showing tapping out the thread in said blank; Fig. 7 is the nut after having been threaded and again brought into normal position, the threads out of register. It is in this position that the tempering should have its final effect so that the spring will tend to keep it in this position; Fig. 8 is the nut in place on a bolt, being opened by the pressure on the thread of the bolt and tending to close caused by the spring in the yoke after tempering.

Figure 10:
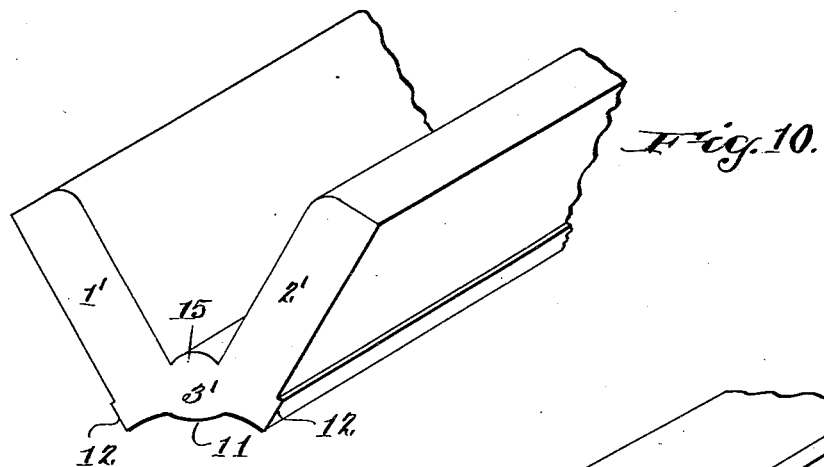
Figure 11:
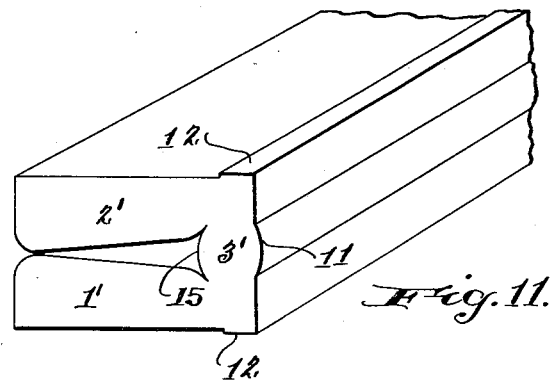
Figure 12:
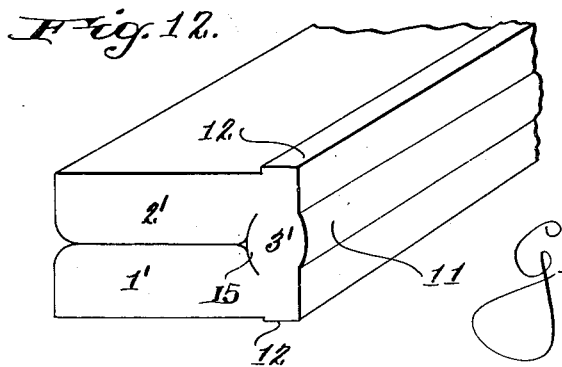
Figure 13:
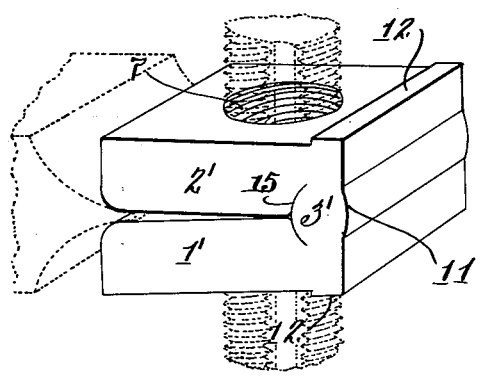
Figure 14:
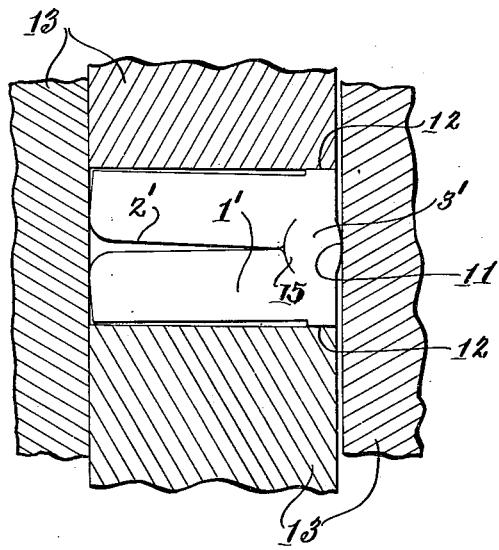
Figure 15:
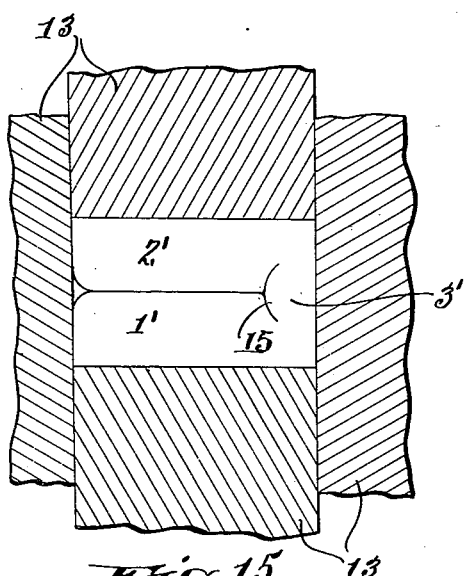
Figure 16:
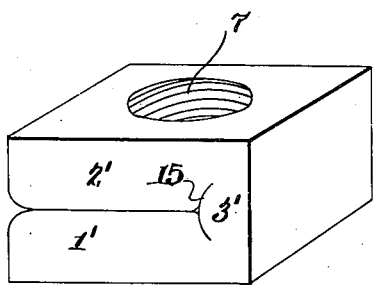

In a modified embodiment of the invention wherein the tempering is caused by pressure, I have shown somewhat similar figures to the above; Fig. 9 being a view of a bar formed to be rolled into a finished product from which my nuts may be fabricated; Fig. 10, the same bar shown in Fig. 9 after having again passed the rolls; Fig. 11, showing the same bar after having again passed the rolls; Fig. 12, showing the same bar after final rolling, leaving it in a condition to have the nut blanks cut therefrom; and Fig. 13 is a similar view to that shown in Fig. 6, the nut opened and being threaded; Fig. 14 is the nut in the bumping die ready for hardening the yoke; Fig. 15 is the nut in the bumping die after having had the yoke compressed to harden the same, and Fig. 16 is the finished bumped nut similar to the product shown in Fig. 7, but hardened by bumping, hammering, or pressing, in place of heat treating.

In the embodiment of the invention illustrated in Figs. 1 to 8 inclusive, 1 and 2 designate, in Figs. 1 and 2, the two portions of a bar adapted to be rolled into superimposed relation as shown in Figs. 3 and 4 to provide the correspondingly designated pair of superimposed nut portions illustrated in Figs. 5 to 8 of the drawings after the bar has been sheared into nut lengths. 3 designates a yoke connecting the portions 1 and 2. 4 is a spreading tool. 5 is a tap. 6 is a thread in the nut. 7 is a thread in the superimposed portions of nut. 8 is a bolt. 9 is a head of the bolt. 10 are the plates to be secured together. In the modified embodiment of the invention shown in Figs 9–16, 1′ and 2′ designate the two portions of the bar adapted to be rolled into superimposed relation to provide the correspondingly designated portions of the finished nut, 3′ designates the yoke connecting said portions, 11 is the yoke bumping material. 12 is the corner bumping material, and 13 the dies for finally stamping the nut from the shape shown in Fig. 14 to the shape shown in Fig 15.

I have discovered that for steel and the ferric metals, heat treating is preferable; but for non-ferric and alloyed metals, the rolling, or stamping, process is preferable.

The apparatus shown in Figs. 14 and 15 treat the individual nut in the dies to harden the yoke. I have discovered that by making a finishing pass of the form shown in Fig. 12, bringing it into the cross-section shown in Fig. 16 by means of the rolls, gives a sufficient spring to the yoke without further hammering, or compressing, and still leaves the nut and the superimposed nut soft enough for cutting from the bar and threading; this is more adapted to hard brass and alloys.

In ferric metals, the finished bar may be made by the rolling process as described in the modified form and the nuts cut therefrom where only a slight temper, or hardening, is required. I do not wish to limit myself to either means of hardening, or tempering, for either ferric, or non-ferric, metals.

By reference to the drawings it will be observed that according to both of the herein described methods of producing a nut, a bar or blank is passed successively between rolls to progressively impart to the bar or blank the form illustrated in Figs. 4 and 12. During this rolling and progressive folding of the portions 1 and 2 or 1′ and 2′ of the blank into superimposed relation, a fillet 15 is formed to project from the yoke portion 3 into the space between the portions 1 and 2 so that in the final rolled form of the bar or blank this fillet results in the line of division between the portions 1 and 2 being diverged at the junction of said portions 1 and 2 with the yoke portion 3, thereby rendering the portions 1 and 2 capable of being repeatedly separated and moved together without impairing the resiliency of the connection between said portions and without danger of crystallization and cracking of the yoke portion 3 in a line with the adjacent faces of the portions 1 and 2, which was found to be a serious fault with nuts formed in the present manner but without means such as the fillet 15 to assist in avoiding cracking apart of the portions 1 and 2 due to hinging movements of said portions relative to one another occasioned by repeated uses of the nut.

Having thus described my invention, what I claim and desire to secure by Letters Patent is:

The process of forming a nut which consists in rolling a bar or blank to fold different portions thereof into superimposed relation, forming a fillet on the bar or blank extending into the space between the superimposed portions thereof from the portion connecting said superimposed portions whereby the line of division between the superimposed portions diverges at the junction of said portions, shearing the folded bar or blank into nut lengths, and punching and threading the nuts blanks.

GEORGE C. EASTER.